United States Patent
Ban et al.

[11] Patent Number: 5,246,586
[45] Date of Patent: Sep. 21, 1993

[54] APPARATUS AND METHOD FOR PRODUCING ULTRAPURE WATER AND METHOD OF CONTROLLING THE APPARATUS

[75] Inventors: Cozy Ban; Takaaki Fukumoto, both of Itami, Japan

[73] Assignee: Mitsubishi Denki Kabushiki Kaisha, Tokyo, Japan

[21] Appl. No.: 897,042

[22] Filed: Jun. 11, 1992

[30] Foreign Application Priority Data

Dec. 24, 1991 [JP] Japan .................................. 3-341110

[51] Int. Cl.⁵ ..................... B01D 61/02; B01D 61/08; B01D 61/12
[52] U.S. Cl. .................................. 210/638; 210/652; 210/724; 210/195.2; 210/257.2; 210/321.65

[58] Field of Search ............... 210/167, 634, 637, 638, 210/642, 644, 649-652, 660, 681-686, 739, 743, 758, 723, 724, 725, 85, 195.2, 257.2, 321.6, 321.65, 321.72, 294

[56] References Cited

U.S. PATENT DOCUMENTS

3,870,033  3/1975  Faylor et al. .................. 210/167
4,917,806  4/1990  Matsunaga et al. ............. 210/662

*Primary Examiner*—Frank Sever
*Attorney, Agent, or Firm*—Leydig, Voit & Mayer

[57] ABSTRACT

An apparatus for producing ultrapure water includes a cation exchange resin tower, a decarbonation tower, an anion exchange resin tower, and a pH adjustor for changing the zeta potential of the impurities contained in water. The pH value is adjusted to aggregate or ionize the impurities. The apparatus can be controlled so that the treated water is introduced into a reverse osmosis unit or an oxidation tower and an after reverse osmosis unit according to the quality of the treated water.

15 Claims, 6 Drawing Sheets

APPARATUS AND METHOD FOR PRODUCING ULTRAPURE WATER AND METHOD OF CONTROLLING THE APPARATUS

BACKGROUND OF THE INVENTION

1. Field of the invention

The present invention relates to an apparatus and method for producing ultrapure water and a method of controlling the apparatus, and particularly to a high-efficiency apparatus and method for producing ultrapure water which are used for producing semiconductors and a method of controlling the apparatus.

2. Description of Related Art

Figure 7:
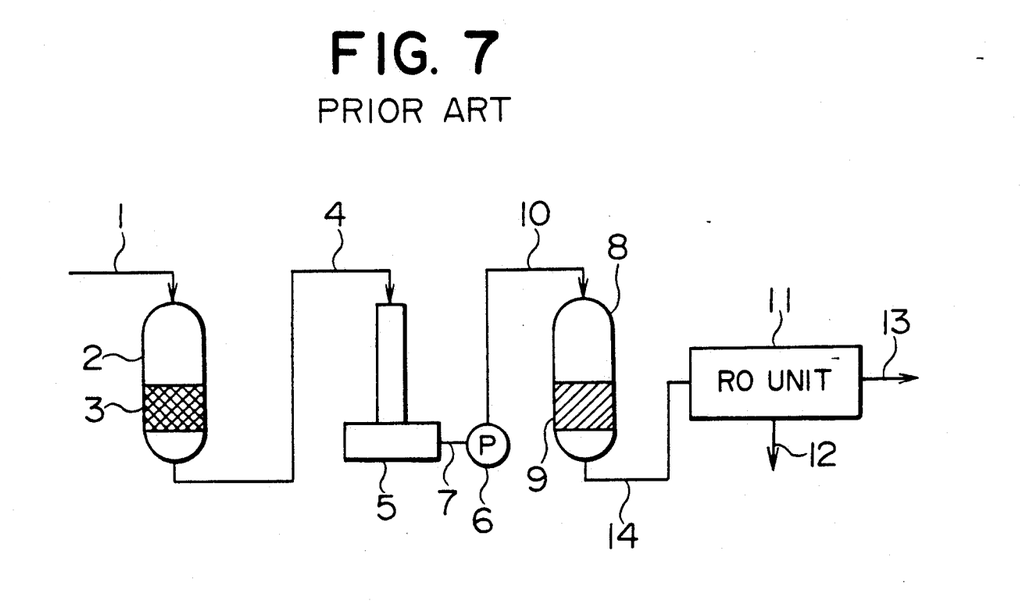
FIG. 7 is a schematic block diagram of a conventional apparatus for producing ultrapure water.

FIG. 7 shows a principal portion of a conventional apparatus for producing ultrapure water in a primary pure water system (after pretreatment), which is most frequently used.

In the drawing, the primary pure water (referred to as "pretreated water" hereinafter) which is subjected to pretreatment is introduced, by piping 1, into an upper portion of a cation exchange resin tower 2 which is charged with a cation exchange resin 3. The lower end of the cation exchange resin tower 2 is connected to a decarbonation tower 5 by piping 4. The decarbonation tower 5 is connected to an anion exchange resin tower 8 charged with an anion exchange resin 9 by piping 10 through a pump 6. The anion exchange resin tower 8 is connected to a reverse osmosis membrane unit (referred to as "RO unit" hereinafter) provided with a reverse osmosis membrane by piping 14.

In the conventional apparatus for producing ultrapure water configured as described above, the pretreated water is first introduced into the cation exchange resin tower 2 by the piping 1. After cations such as $Na^+$ ions and the like contained in the pretreated water introduced into the cation exchange resin tower 2 are adsorbed on the cation exchange resin 3 charged in the tower 2, the pretreated water is poured into the decarbonation tower 5 through the piping 4. In the decarbonation tower 5, $CO_2$ is removed from the pretreated water. The pretreated water is then sent up to the upper portion of the anion exchange resin tower 8 from the decarbonation tower 5 by the pump 6 through the piping 7, 10. The anions in the pretreated water are replaced by the reactive groups of the anion exchange resin 9 charged in the anion exchange resin tower 8 and changed to $OH^-$ ions. The $H^+$ supplied from the cation exchange resin and $OH^-$ supplied from the anion exchange resin form $H_2O$. In this way, most of charged impurities are removed.

The water treated in the anion exchange resin tower 8 is then poured, by the piping 14, into the RO unit 11 for removing charged and neutral impurities from the water. The thus-obtained ultrapure water is supplied to a use point from piping 13, and the water containing concentrated charged and neutral impurities is discharged from an discharge pipe 12.

The above-described apparatus for producing ultrapure water has the problem that charged and neutral impurities cannot be removed with high efficiency because they have a small particle size. Particularly, colloidal impurities cannot be easily removed because they have a size of 0.001 to 1 $\mu m$ and intermediate properties between the properties of ions and neutral particles. The apparatus also has the problem that if an attempt is made to remove such impurities having a small size, the load of treatment is applied to the after system, and the after system is excessively increased in its cost and space.

SUMMARY OF THE INVENTION

The present invention has been made for solving the above problems, and it is an object of the invention to provide an apparatus and method for producing ultrapure water for removing with high efficiency charged and neutral impurities mainly consisting of colloidal impurities, and a method of controlling the apparatus.

In order to achieve the object, the present invention provides an apparatus for producing ultrapure water comprising a cation exchange resin tower, a decarbonation tower, and pH adjusting means for changing the zeta ($\zeta$) potential of impurities contained in treated water by adjusting the pH of the treated water so as to aggregate or ionize the impurities.

The present invention also provides a method of controlling an apparatus for producing ultrapure water comprising introducing, into a reverse osmosis membrane unit, the water treated by a cation exchange resin tower, a decarbonation tower, an anion exchange resin tower and a pH adjustor injecting means; measuring the quality of the water treated by the reverse osmosis membrane unit; and supplying the water treated by the reverse osmosis membrane unit to a use point when the quality of the water is better than that shown by predetermined threshold values, and further introducing the treated water into oxidative aggregation means for adding an oxidizer to the treated water and a reverse osmosis membrane unit in a rear stage for removing aggregated fine particles from the treated water supplied from the oxidative aggregation means and then supplying the water to the use point when the quality of the treated water is worse than that shown by the predetermined threshold values.

In a preferred form of the invention, the method of controlling the apparatus for producing ultrapure water comprises measuring the quality of the water treated by a cation exchange resin tower, a decarbonation tower, an anion exchange resin tower and a pH adjustor injecting means; and, when the quality is better than that shown by predetermined threshold values, introducing the treated water to a reverse osmosis membrane unit and then supplying the water to a use point, and when the quality is worse than that shown by the predetermined threshold values, further introducing the treated water into oxidative aggregation means for adding an oxidizer to the treated water and an after reverse osmosis membrane unit for removing the aggregated fine particles from the treated water supplied from the oxidative aggregation means and then supplying the water to the use point.

The present invention further provides a method of producing ultrapure water comprising changing the zeta potential of the impurities contained in water to be treated by adjusting the pH of the water passed through a cation exchange resin tower, a decarbonation tower and an anion exchange resin tower so as to aggregate or ionize the impurities; and then removing the impurities by a reverse osmosis membrane unit.

DETAILED DESCRIPTION OF PREFERRED EMBODIMENTS

Figure 1:
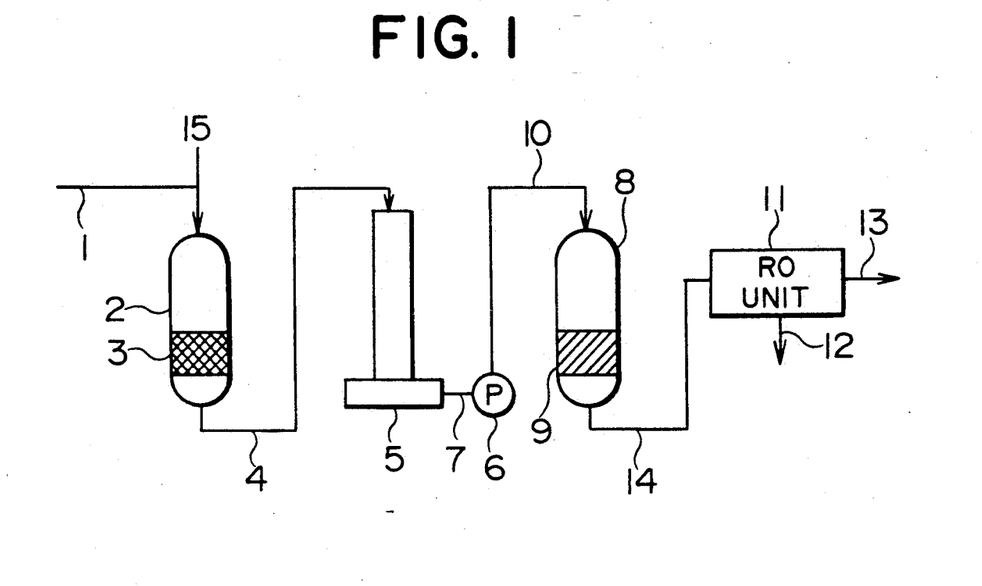
FIG. 1 is a schematic block diagram of an apparatus for producing ultrapure water according to an embodiment of the present invention.

FIG. 1 is a schematic block diagram showing an apparatus for producing ultrapure water in accordance with an embodiment of the present invention. In the respective drawings, the same or equivalent portions are denoted by the same reference numerals. In FIG. 1, a pH adjustor injecting pipe 15 as a pH adjusting means is provided on piping 1 for pouring the pretreated water into a cation exchange resin tower 2. Since the other constituent members are the same as those in the conventional apparatus, they are not described below. The apparatus of the present invention preferably comprises 2B3T (two beds three towers), like the conventional apparatus.

The operation of the apparatus for producing ultrapure water configured as described above is as follows. The case where the pretreated water is made weakly acidic is first described below.

Embodiment 1

Before the pretreated water is introduced into the cation exchange resin tower 2 from the piping 1, an acid, e.g., $H_2CO_3$, is poured into the water from the pH adjustor injecting pipe 15 in order to decrease the pH value of the pretreated water to about 4 and supply $H^+$ ions thereto. As a result, the negative zeta ($\zeta$) potential of impurities is increased to a value close to zero, and the impurities are aggregated due to a decrease in the Coulomb repulsive force and form fine particles.

The water introduced into the cation exchange resin tower 2 is passed through the cation exchange resin 3 on which positively charged ions in the water are adsorbed and replaced by $H^+$. After $CO_2$ is removed from the water by the decarbonation tower 5, the water is introduced, through the pump 6, into the anion exchange resin tower 8 in which anions including $CO_3^{2-}$ are removed by the anion exchange resin 9 and replaced by $OH^-$. The fine particles formed in the 2B3T portion and the fine particles contained in the treated water are removed as fine particles by the RO unit 11, and the charged particles contained in the treated water are removed as ions by the RO unit 11.

When the treated water contains only small amounts of fine particles, the treated water may be supplied directly to the use point from the piping 14, without passing through the RO unit 11.

Embodiment 2

The case where the pretreated water is made weakly alkaline is described below.

Before the pretreated water is introduced into the cation exchange resin tower 2 through the piping 1, an alkali, e.g., $NaHCO_3$, is poured into the water from the pH adjustor injecting pipe 15 in order to increase the pH value of the pretreated water to about 8 and supply $OH^-$. As a result, the negative zeta ($\zeta$) potential of impurities is further decreased to a negative value, and the impurities are easily changed to negative polyvalent ions. The water introduced into the cation exchange resin tower 2 is passed through the cation exchange resin 3 on which the positively charged particles are adsorbed and replaced by $H+$.

After $CO_2$ is then removed from the water passed through the cation exchange resin tower 2, the water is introduced into the anion exchange resin tower 8 through the pump 6. In the anion exchange resin tower 8, negatively charged fine particles including $CO_3^{2-}$ are removed by the anion exchange resin 9. Namely, in the anion exchange resin tower 8, both the anions formed by the alkali which is previously poured from the pH adjustor injecting pipe 15 and the anions contained in the pretreated water are removed and replaced by $OH^-$.

By the reverse osmosis membrane in the RO unit 11, neutral fine particles are removed as fine particles, and the negatively charged fine particles formed by the alkali poured from the pH adjustor injecting pipe 15 and the charged fine particles contained in the pretreated water are removed as ions. Polyvalent ions are more easily removed by the RO unit 11, and the system-wide efficiency of impurity removal is thus increased.

Embodiment 3

Figure 2:
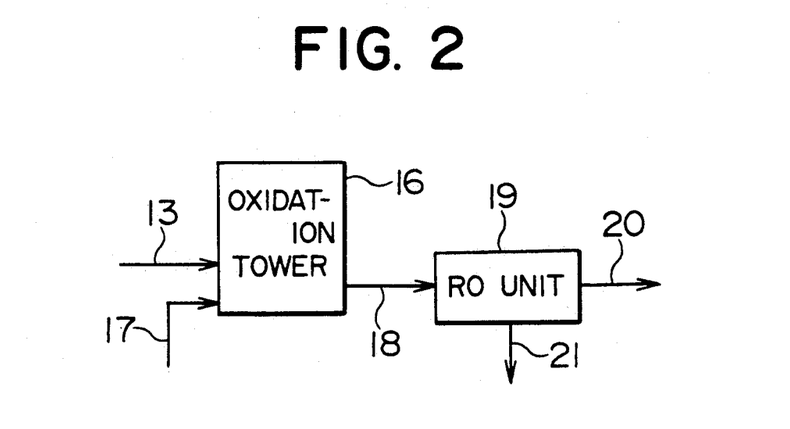
FIG. 2 is a schematic block diagram of an apparatus for producing ultrapure water according to another embodiment of the present invention.

In Embodiment 3, although the polyvalent ions obtained by supplying $OH^-$ to the neutral and charged impurities are removed by the same method as that employed in Embodiment 2, the treated water is further passed through the flow shown in FIG. 2. Namely, the treated water supplied from the flow shown in FIG. 1 is introduced into an oxidation tower 16 from piping 13. An oxidizer injecting pipe 17 is provided on the oxidation tower 16 so as to inject an oxidizer such as ozone or the like. The water treated by the oxidation tower 16 is introduced into an after RO unit 19 through piping 18.

The treated water passed through the oxidation tower 16 contains only fine neutral and charged particles having a small particle size which allows the particles to pass through the RO unit 11. The treated water introduced into the oxidation tower 16 is oxidized by the oxidizer poured from the oxidizer injecting pipe 17 to form particles having a large particle size after oxidative aggregation. At this time, since fine particles which can generally be removed by the reverse osmosis membrane have already been removed by the RO unit 11, 100% of oxidizer poured from the oxidizer injecting pipe 17 is used for increasing the size of fine particles to a value which allows the particles to be removed by the after RO unit 19.

The water treated by the oxidation tower 16 is then introduced, through piping 18, into the after RO unit 19 in which the aggregated fine particles are removed. The water treated by the after RO unit 19 is supplied to a use point (not shown) through piping 20, the fine particles removed are discharged through a second discharge pipe 21.

Embodiment 4

Figure 3:
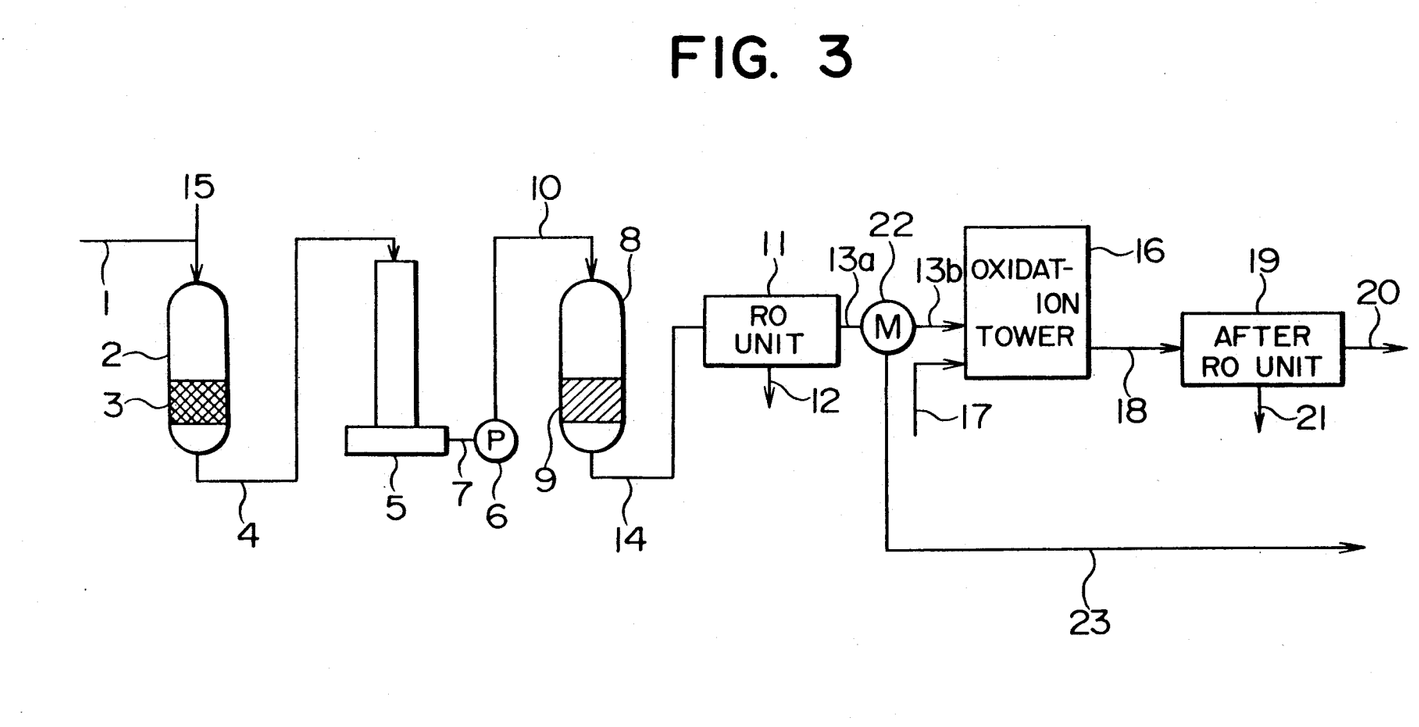
FIG. 3 is a schematic block diagram for explaining a method of controlling an apparatus for producing ultrapure water according to still another embodiment of the present invention.

The case where fine particles are sufficiently removed by the RO unit 11 is described below with reference to FIG. 3. In this case, the quality of the treated water discharged from piping 13a is monitored by a monitor 22, for example, with respect to the number of fine particles and resistivity of the water. If the number of fine particles 20 μm or more in size is at least 100/ml and the resistivity is 5 MΨ·cm or less, respectively, both of which are threshold values, the water is poured into the oxidation tower 16 through piping 13b by the monitor 22 provided with a change-over valve (not shown). The treated water is oxidized by the oxidation tower 16, and fine particles are removed by the after RO unit 19, by the same method as that described above. If the number of fine particles and resistivity of the treated water are 100/ml or less and 5 MΨ·cm or more, respectively, the treated water is supplied directly to the use point from piping 23.

Embodiment 5

Figure 4:
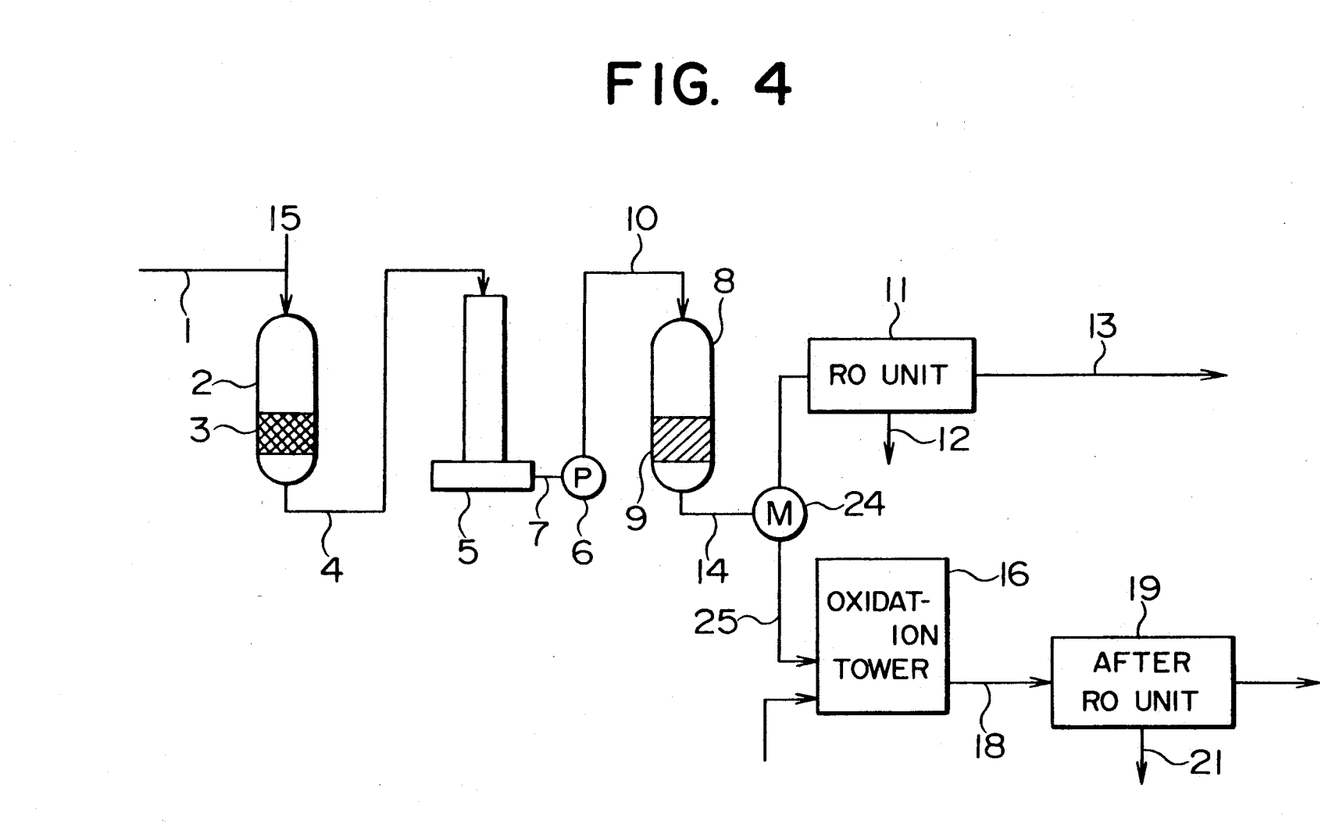
FIG. 4 is a schematic block diagram for explaining a method of controlling an apparatus for producing ultrapure water according to a further embodiment of the present invention.

FIG. 4 shows a flow in the case where the RO unit 11 is arranged in parallel with the oxidation tower 16 and the after RO unit 19. The quality of the treated water discharged from piping 14 is monitored on the basis of the same threshold values as those used in Embodiment 4. If the quality of the treated water is bad and cannot be improved only by the RO unit 11, the treated water is introduced into the oxidation tower 16 through piping 25 in response to a monitor 24 provided with a change-over valve (not shown) so that the water can be treated in the same way as that described above.

Embodiment 6

Figure 5:
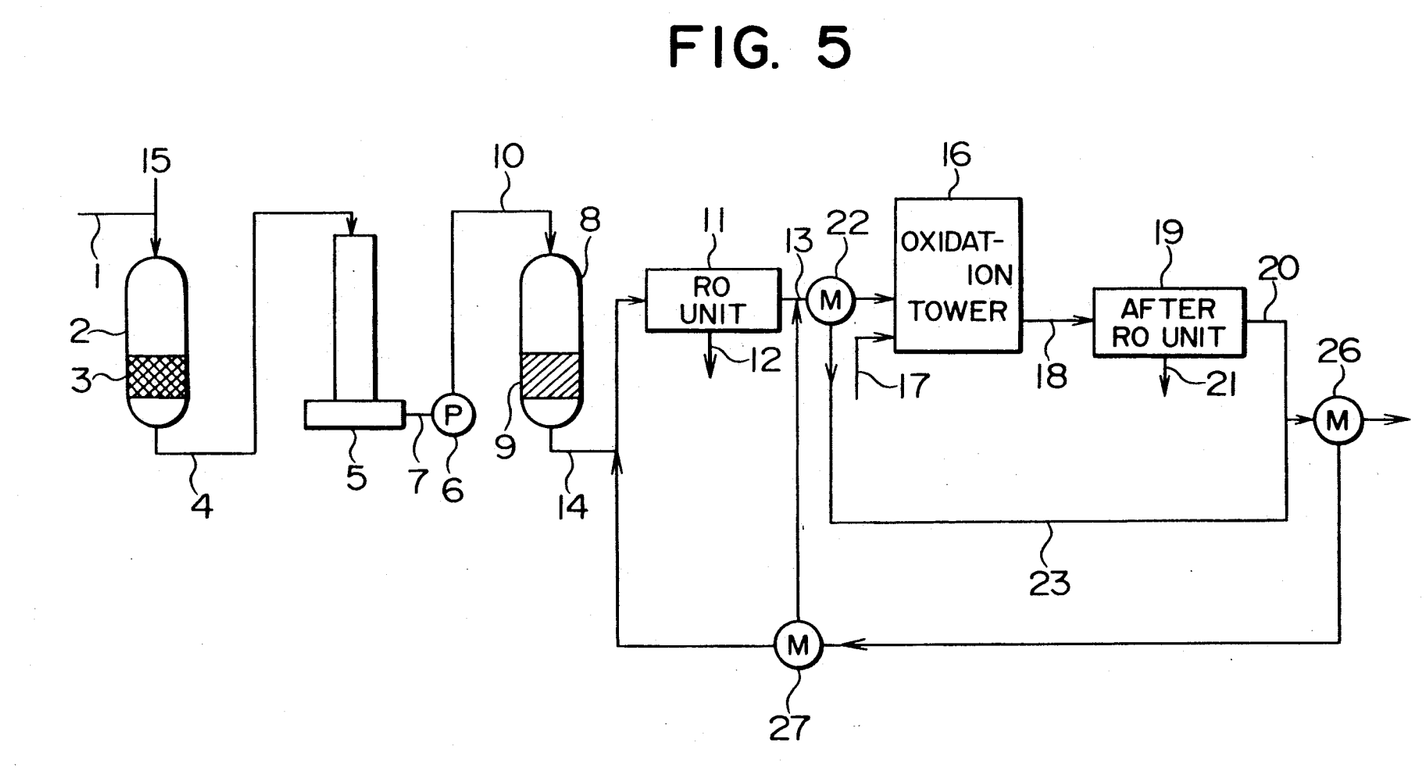
FIG. 5 is a schematic block diagram for explaining a method of controlling an apparatus for producing ultrapure water according to a still further embodiment of the present invention.
Figure 6:
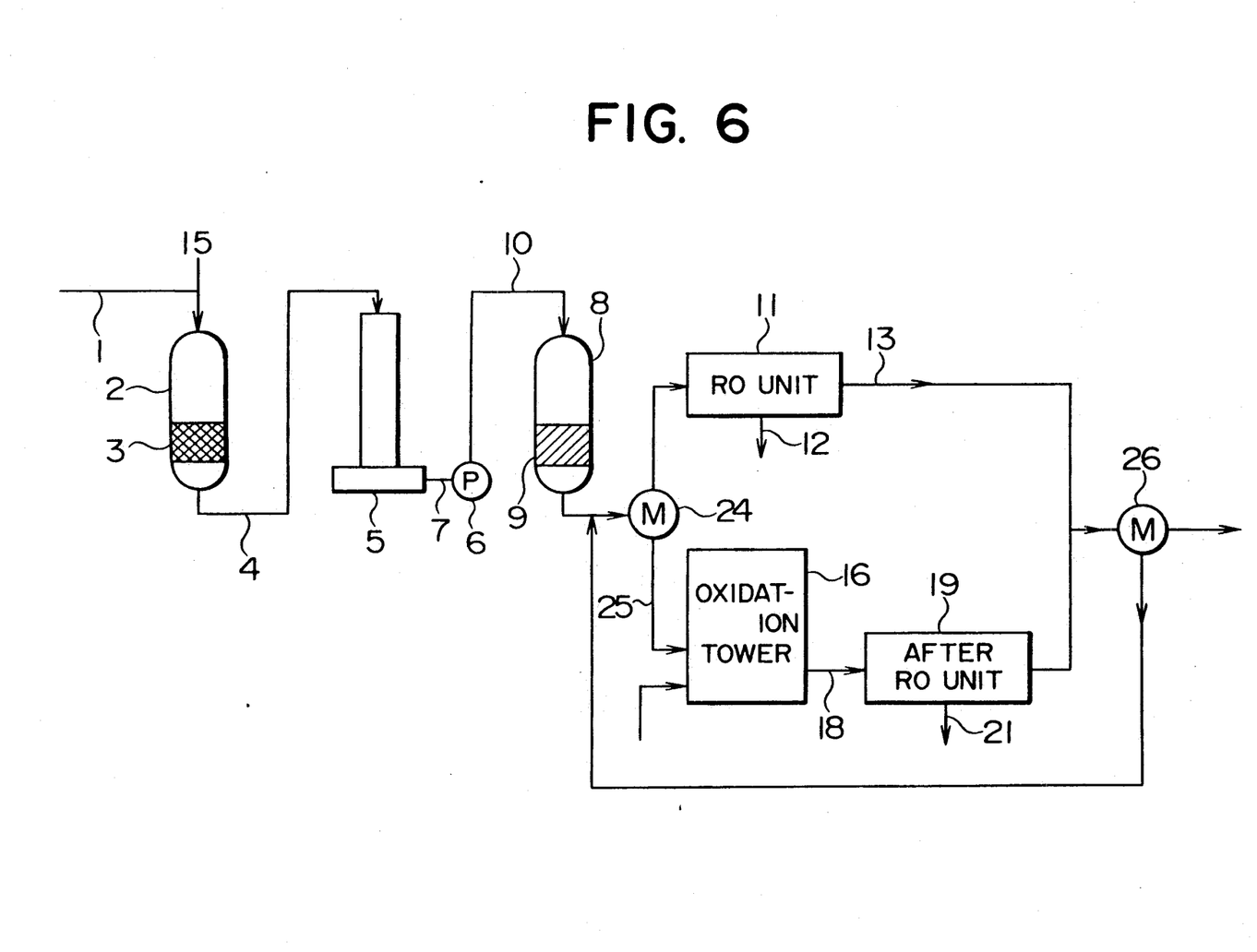
FIG. 6 is a schematic block diagram for explaining a method of controlling an apparatus for producing ultrapure water according to a further embodiment of the present invention.

In the above-described apparatus for producing ultrapure water in Embodiment 4 or 5, the quality of the treated water can be further monitored by a monitor 26 immediately before the water is supplied to the use point and can be controlled so that the water is fed back to the RO unit 11 or the after RO unit 19 according to the quality of the water, as shown in FIGS. 5 and 6.

In this embodiment, when the treated water is fed back to the after RO unit 19, the threshold values are 1/ml or more of fine particles of at least 0.2 μm, in size resistivity of 18 MΩ·cm or less, and TS (total solid) of 5 ppb or more. However, the threshold values can be appropriately selected according to use of the ultrapure water used at the use point. In addition, in the case shown in FIG. 5, the treated water fed back from the monitor 26 may be introduced into a portion either ahead of or behind the RO unit 11 through a monitor 27 according to the quality of the water.

Although, in the above embodiments, an acid or alkali for adjusting pH is poured into the treated water before being introduced into the cation exchange resin tower 2, an acid or alkali may be divided into a plurality of parts and poured several times in the processes including the subsequent processes. If acid and alkali are combined so as match to the ion exchange resin used, the same effects as those described above can be obtained.

In addition, although, in the above embodiments, an acid or alkali is poured as a pH adjustor for aggregating or ionizing impurities, if H+ and OH− are supplied by electrolysis or the like, the same effects as those described above are exhibited.

Further, although an oxidizer such as ozone or the like is used in the oxidation tower 16, other means may be used therein. For example, a UV oxidation lamp can be used. A fine particle removing unit such as an UMF (Ultra Membrane Filter) may be used as the after RO unit 19.

What is claimed is:

1. An apparatus for producing ultrapure water comprising:
 a cation exchange resin tower, a decarbonation tower, an anion exchange resin tower serially connected for purifying water, pH adjusting means connected to the cation exchange resin tower for changing the zeta potential of particulate impurities contained in the treated water by adjusting the pH of the treated water to aggregate the particulate impurities to a size sufficient for removal in a reverse osmosis process, and a reverse osmosis membrane unit for removing the aggregated impurities, said reverse osmosis membrane unit being connected to receive the treated water that has passed through said cation exchange resin tower, said decarbonation tower, and said anion exchange resin tower.

2. An apparatus according to claim 1 comprising oxidative aggregation means for adding an oxidizer to the treated water, serially connected after said reverse osmosis membrane unit, and an after reverse osmosis unit connected after oxadative aggregation means for removing fine particles from said treated water discharged from said oxidative aggregation means.

3. The apparatus according to claim 2 wherein the after reverse osmosis unit comprises an ultra membrane filter.

4. A method of controlling an apparatus for producing ultrapure water comprising:
 treating water in a cation exchange resin tower, in a decarbonation tower, in an anion exchange resin tower, with a pH adjusting means to aggregate particulate impurities to a size sufficient for removal in a reverse osmosis process, and in a reverse osmosis membrane unit to remove aggregated particles;
 measuring the quality of the water treated; and
 when the water quality is better than a predetermined threshold quality, supplying the water treated by said reverse osmosis membrane unit to use point, and when the water quality is worse than the predetermined threshold quality, adding an oxidizer in an oxidative aggregation means to the water to aggregate fine particles and removing the aggregated fine particles from the treated water in an after reverse osmosis membrane unit and then supplying the treated water to the use point.

5. A method according to claim 4 including measuring the quality of the treated water supplied from said reverse osmosis membrane unit or said after reverse osmosis membrane unit and, when the quality of said treated water is worse than said predetermined threshold quality, returning the water to said reverse osmosis membrane unit or said oxidative aggregation means for further treatment.

6. The method according to claim 4 including treating the water in the pH adjusting means to make the water weakly acidic.

7. The method according to claim 4 including treating the water with the pH adjusting means to adjust the pH of the water to about 4.

8. The method according to claim 4 including treating the water with the pH adjusting means to make the water weakly alkaline.

9. The method according to claim 4 including treating the water with the pH adjusting means to adjust the pH of the water to about 8.

10. The method according to claim 4 comprising treating the water sequentially with the pH adjusting means, the cation exchange resin tower, the decarbonation tower, the anion exchange resin tower, and the reverse osmosis membrane unit.

11. A method of controlling an apparatus for producing ultrapure water comprising;
    measuring the quality of the water treated by a cation exchange resin tower, a decarbonation tower, an anion exchange resin tower, and with a pH adjusting means to aggregate particulate impurities to a size sufficient for removal in a reverse osmosis process; and
    when the water quality is better than a predetermined threshold quality, introducing the treated water to a reverse osmosis membrane unit to remove the aggregated particulate impurities and then supplying the water to a use point, and when said water quality is worse than the predetermined threshold quality, adding an oxidizer to the treated water in an oxidative aggregation means to aggregate fine particles and removing the aggregated fine particles in an after reverse osmosis membrane unit and then supplying the treated water to the use point.

12. A method according to claim 11 comprising measuring the quality of the treated water supplied from said reverse osmosis membrane unit or said after reverse osmosis membrane unit and, when said water quality is worse than the predetermined threshold quality, returning the treated water to said reverse osmosis membrane unit or said oxidative aggregation means for further treatment.

13. The method according to claim 11 comprising treating the water sequentially with the pH adjusting means, the cation exchange resin tower, the decarbonation tower, and the anion exchange resin tower.

14. A method of producing ultrapure water comprising:
    changing the zeta potential of particulate impurities contained in water by adjusting the pH value of the water to aggregate the impurities to a size sufficient for removal in a reverse osmosis process;
    passing the water through a cation exchange resin tower, a decarbonation tower, and an anion exchange resin tower; and
    removing the aggregated impurities by reverse osmosis.

15. A method according to claim 14 comprising aggregating remaining impurities after reverse osmosis by adding an oxidizer to aggregate fine particles and removing the aggregated fine particles in an after reverse osmosis membrane unit.

* * * * *